United States Patent
Kamel et al.

(10) Patent No.: US 9,782,862 B2
(45) Date of Patent: Oct. 10, 2017

(54) COMPONENT REPAIR USING BRAZED SURFACE TEXTURED SUPERALLOY FOIL

(71) Applicant: Siemens Energy, Inc., Orlando, FL (US)

(72) Inventors: Ahmed Kamel, Orlando, FL (US); Dhafer Jouini, Orlando, FL (US); Gary B. Merrill, Orlando, FL (US); Kazim Ozbaysal, Charlotte, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 14/768,136

(22) PCT Filed: Mar. 14, 2014

(86) PCT No.: PCT/US2014/028200
§ 371 (c)(1),
(2) Date: Aug. 14, 2015

(87) PCT Pub. No.: WO2014/197087
PCT Pub. Date: Dec. 11, 2014

(65) Prior Publication Data
US 2015/0375346 A1    Dec. 31, 2015

Related U.S. Application Data

(60) Provisional application No. 61/787,153, filed on Mar. 15, 2013.

(51) Int. Cl.
B23P 6/00       (2006.01)
B23K 35/02     (2006.01)
(Continued)

(52) U.S. Cl.
CPC ............ *B23P 6/005* (2013.01); *B23K 1/0018* (2013.01); *B23K 1/20* (2013.01); *B23K 35/0238* (2013.01);
(Continued)

(58) Field of Classification Search
CPC ...................................................... B05D 5/005
(Continued)

(56) References Cited

U.S. PATENT DOCUMENTS 5,523,169 A        6/1996   Rafferty et al.
5,952,042 A *     9/1999   Rafferty ............. B23K 35/0233
                                                                    427/189
(Continued)

FOREIGN PATENT DOCUMENTS

CN       101845969 A       9/2010
EP       1201778 A2        5/2002
(Continued)

OTHER PUBLICATIONS

Warren Miglietti, High Strength, Ductile Braze Repairs for Stationary Gas Turbine Components, Part 2, ASME Conference Proceedings, ASME Turbo Expo 2009: Power for Land, Sea, and Air (GT2009), Jun. 8-12, 2009, Orlando, Florida, USA.
(Continued)

*Primary Examiner* — Jessee Roe

(57) ABSTRACT

A superalloy component such as a gas turbine engine blade (40) having a ceramic thermal barrier coating (41) is repaired using a textured repair foil (30). A degraded region of the thermal barrier coating is removed (14) and the underlying superalloy material surface is prepared (16) for re-coating. The repair foil is includes a layer of boron-free braze material (34) and a layer of superalloy material (32) having a textured surface (36). The foil is brazed (18) to the prepared surface during a solution heat treatment effective to
(Continued)

homogenize the braze (20). A new area of thermal barrier coating (46) is applied over the foil with a bond that is enhanced by the texturing of the foil surface.

6 Claims, 2 Drawing Sheets

(51) Int. Cl.
    *B23K 35/30*     (2006.01)
    *C22C 19/05*     (2006.01)
    *B32B 15/01*     (2006.01)
    *F01D 5/28*     (2006.01)
    *B23K 1/00*     (2006.01)
    *B23K 1/20*     (2006.01)
    *C22C 30/00*     (2006.01)
    *C22F 1/18*     (2006.01)

(52) U.S. Cl.
    CPC ........ *B23K 35/304* (2013.01); *B23K 35/3033* (2013.01); *B32B 15/01* (2013.01); *C22C 19/056* (2013.01); *C22C 19/058* (2013.01); *C22C 30/00* (2013.01); *C22F 1/18* (2013.01); *F01D 5/282* (2013.01); *F01D 5/288* (2013.01); *Y10T 428/12438* (2015.01); *Y10T 428/12618* (2015.01)

(58) Field of Classification Search
    USPC ........................................................ 427/140
    See application file for complete search history.

(56) References Cited

U.S. PATENT DOCUMENTS

| | | | |
|---|---|---|---|
| 6,027,584 A | 2/2000 | Jackson et al. | |
| 6,042,880 A | 3/2000 | Rigney et al. | |
| 6,210,812 B1 | 4/2001 | Hasz et al. | |
| 6,464,128 B1 | 10/2002 | Messelling | |
| 6,520,401 B1 | 2/2003 | Miglietti | |
| 6,530,971 B1 | 3/2003 | Cohen et al. | |
| 6,726,086 B2 | 4/2004 | Philip | |
| 7,293,688 B2 | 11/2007 | Ozbaysal | |
| 7,328,832 B2 | 2/2008 | Ozbaysal | |
| 7,335,427 B2 | 2/2008 | Sathian | |
| 7,363,707 B2 | 4/2008 | Powers | |
| 7,434,720 B2 | 10/2008 | Ozbaysal | |
| 7,461,772 B2 | 12/2008 | Ozbaysal | |
| 7,506,793 B2 | 3/2009 | Sathian | |
| 7,748,601 B2 | 7/2010 | Ozbaysal | |
| 7,867,628 B2 | 1/2011 | Ozbaysal | |
| 8,087,565 B2 | 1/2012 | Kottilingam et al. | |
| 8,356,409 B2 | 1/2013 | Perret | |
| 8,640,942 B1 * | 2/2014 | Ozbaysal ........... | B23K 35/3033 228/119 |
| 9,573,228 B2 | 2/2017 | Ozbaysal | |
| 2005/0281704 A1 | 12/2005 | Srinivasan | |
| 2007/0063351 A1 * | 3/2007 | Duda ..................... | C23C 4/02 257/758 |
| 2007/0224445 A1 | 9/2007 | Hasegawa et al. | |
| 2009/0068446 A1 | 3/2009 | Bischof et al. | |
| 2009/0159645 A1 | 6/2009 | Cretegny et al. | |
| 2010/0038412 A1 | 2/2010 | Huang | |
| 2010/0059573 A1 | 3/2010 | Kottilingam et al. | |
| 2010/0266417 A1 | 10/2010 | Gorman et al. | |
| 2014/0220384 A1 | 8/2014 | Stamm | |

FOREIGN PATENT DOCUMENTS

| | | |
|---|---|---|
| EP | 2233450 A1 | 9/2010 |
| EP | 2568054 A1 | 3/2013 |
| JP | 2012112290 A | 6/2012 |

OTHER PUBLICATIONS

Xiao Huang, et al., Wide Gap Braze Repair of Gas Turbine Blades and Vanes—A Review, Journal of Engineering for Gas Turbines and Power, vol. 134, Jan. 2012, pp. 010801-1 thru 010801-17.

* cited by examiner

COMPONENT REPAIR USING BRAZED SURFACE TEXTURED SUPERALLOY FOIL

This application is the US National Stage of International Application No. PCT/US2014/028200 filed Mar. 14, 2014, and claims the benefit thereof. The International Application claims benefit of the 15 Mar. 2013 filing date of United States provisional patent application number 61/787,153. All of the applications are incorporated by reference herein in their entirety.

FIELD OF THE INVENTION

This invention relates generally to the field of materials science, and more specifically to the repair of a superalloy gas turbine engine component having a thermal barrier coating (TBC).

BACKGROUND OF THE INVENTION

The hot gas path components of gas turbine engines are often formed of superalloy materials. The term "superalloy" is used herein as it is commonly used in the art; i.e., a highly corrosion and oxidation resistant alloy that exhibits excellent mechanical strength and resistance to creep at high temperatures. Superalloys typically include a high nickel or cobalt content. Examples of superalloys include alloys sold under the trademarks and brand names Hastelloy, Inconel alloys (e.g. IN 738, IN 792, IN 939), Rene alloys (e.g. Rene N5, Rene 80, Rene 142), Haynes alloys, Mar M, CM 247, CM 247 LC, C263. 718, X-750, ECY 768, 282, X45, PWA 1483 and CMSX (e.g. CMSX-4) single crystal alloys.

Modern gas turbine engines have firing temperatures that exceed the safe operating temperatures of known superalloy materials, so components such as combustors, transitions, and early row rotating blades and stationary vanes are often further protected by a thermal barrier coating applied to the exposed surface of the superalloy material. One such thermal barrier coating system includes a metallic bond coat, such as an MCrAlY material, applied to the superalloy material and overlaid by a ceramic insulating material such as yttria stabilized zirconia (YSZ).

The thermal barrier coatings of gas turbine engine components are known to suffer degradation such as erosion, corrosion, oxidation, cracking, spallation, etc. during operation of the engine. Particular areas of particular components may be most susceptible to degradation, such as the leading edge of an airfoil, or the platform or tip of a rotating blade. Engines are periodically dismantled and inspected, and degraded components are removed for refurbishment or replacement as appropriate. A degraded area of thermal barrier coating material may be removed by mechanical or chemical means, the underlying substrate material inspected and repaired as appropriate, and a fresh thermal barrier coating applied. The component may also be subjected to a solution heat treatment in order to restore the mechanical properties of the superalloy material. Examples of known thermal barrier coating materials and repair processes can be found in: U.S. 6,042,880 A (Rigney, et al.); EP 2233450 A1(Alstom Technology Limited); U.S. 6,210,812 (Hasz, et al.); and JP 2012 112290 A (Toshiba Corporation).

BRIEF DESCRIPTION OF THE DRAWINGS

The invention is explained in the following description in view of the drawings that show.

DETAILED DESCRIPTION OF THE INVENTION

While existing repair techniques are effective for returning some gas turbine hot gas path components to service, the repaired components remain vulnerable to the same types of degradation as had originally caused the component to degrade. The present inventors have developed a process that not only repairs a degraded component, but also can reduce the vulnerability of the repaired component to the damaging conditions experienced upon return to service. Advantageously, when the inventive process is applied to a degraded area of a component removed from service, the improvement is thus applied precisely to the most vulnerable (previously degraded) area of the component, thereby potentially extending the operational life of the repaired component to beyond that obtained by the new component. Furthermore, the inventive process can be applied during the manufacturing of a new component to extend its service life when such areas of vulnerability are known from experience on other components or from analytical predictions.

Figure 1:
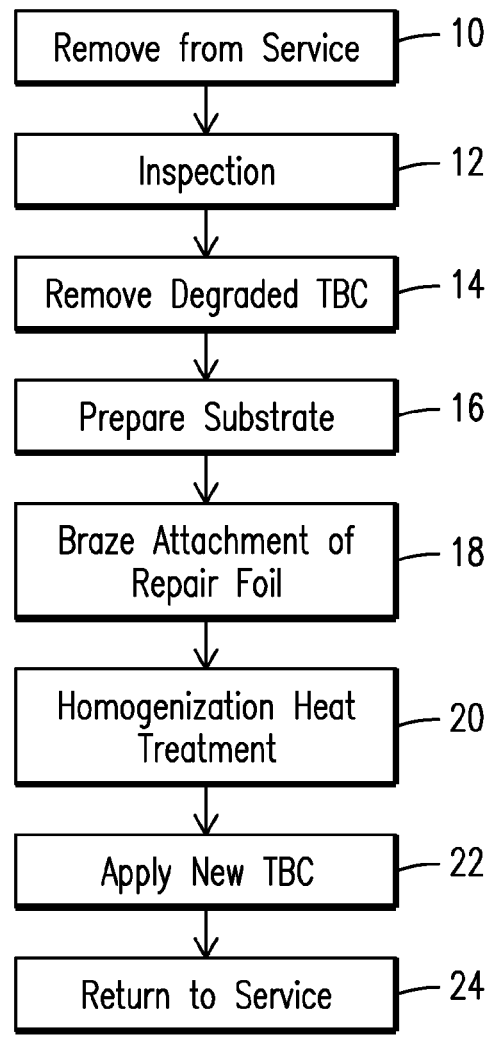
FIG. 1 is a flow chart illustrating steps of a method for repairing a component having a thermal barrier coating.

A method in accordance with one embodiment of the invention is described with reference to FIG. 1. One skilled in the art will appreciate that some of the steps illustrated in FIG. 1 are optional and may not be included in other embodiments. A component, such as a superalloy gas turbine blade, is removed from service 10 and is subjected to an inspection 12. Degraded areas of a thermal barrier coating of the component are removed 14 by any known process to expose the underlying superalloy substrate material. The exposed substrate material is prepared 16 by cleaning after any exposed and repairable flaw has been repaired. A repair foil is then attached to the prepared substrate material by brazing 18, as will be discussed more fully below. The brazing step 18 may also function to repair small discontinuities in the exposed substrate material surface as braze material flows into the discontinuities. The braze is homogenized 20 by a heat treatment that advantageously is performed simultaneously with a solution teat treatment used to restore mechanical properties of the superalloy substrate material. A new replacement thermal barrier coating is applied over the repair foil 22, and the component is returned to service 24.

Figure 2:
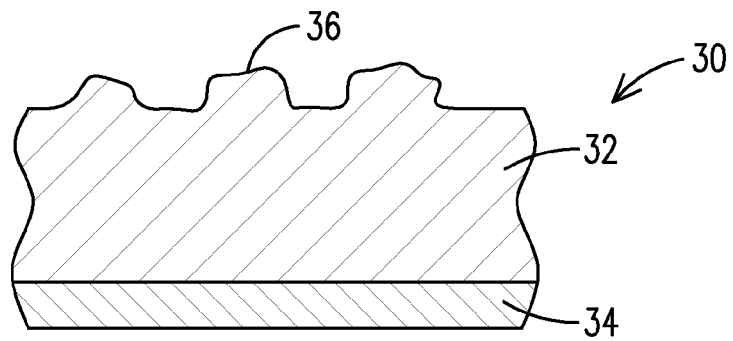
FIG. 2 is a partial cross-sectional view of a repair foil as may be used in the method of FIG. 1.

An embodiment of a repair foil 30 as may be used in step 18 of FIG. 1 for one embodiment of the invention is illustrated in FIG. 2. The foil 30 may be a composite structure including a layer of alloy material 32 joined with an underlying layer of braze material 34. The foil 30 is advantageously flexible due to its thinness, such as being 0.125" (3.175 mm) thick in one embodiment, thereby allowing it to conform to non-planar surfaces being repaired. For the repair of a superalloy gas turbine engine component, the alloy material 32 may be the same superalloy material as that of the component or a compatible superalloy material, and the braze material 34 may be any known material including a boron and silicon free braze material such as described in co-pending U.S. patent application Ser. No. 13/495,223, incorporated by reference herein.

As illustrated in FIG. 2, a top surface 36 of the foil 30 opposed the braze material 34 may be textured to have surface irregularities sized and shaped to be effective to provide an improved bond with a later-applied thermal barrier coating when compared to a similar bond made to a surface without such surface irregularities. The textured surface 36 of the repair foil 30 may be formed by any known method, for example by etching, by electron beam or laser engraving, or by being cast using a process effective to form such irregularities. One such casting process is described in U.S. Pat. No. 7,411,204 B2 and related patents assigned to Mikro Systems, Inc. Alternatively, the repair foil 30 may be formed with a spark plasma sintering process wherein respective layers of powdered braze material 34 and powdered superalloy material 32 are compressed together under pressure and heat between conductive electrodes of a molding fixture while an electrical current is passed between the electrodes and through the powdered material. Localized heating occurs between adjacent particles of the powders as a result of the electrical current, and the heat and pressure are effective to sinter the particles together. The electrode in contact with the superalloy powder has its surface prepared as the mirror image of the desired textured surface 36, thereby forming the textured surface 36 on the foil 30.

Figure 3:
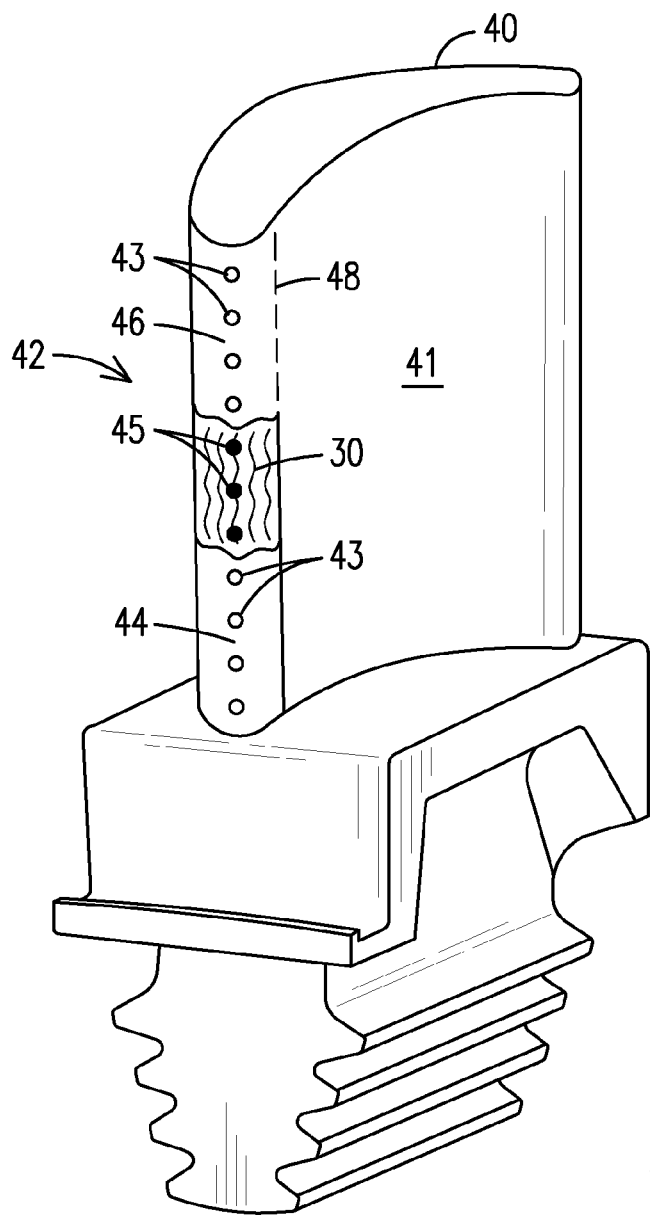
FIG. 3 is a perspective view of a gas turbine engine blade having a repaired leading edge, using a cut-away view to illustrate material layers of the leading edge.

FIG. 3 illustrates a gas turbine engine blade 40 having a ceramic thermal barrier coating 41 repaired by applying a repair foil 30 to a leading edge region 42 of the blade 40. FIG. 3 illustrates the leading edge 42 in a cutaway view to show the prepared superalloy substrate material 44, the overlying repair foil 30, and the finished surface of the newly applied thermal barrier coating 46. It is known that the leading edge 42 is subjected to direct impingement by the hot combustion gas and tends to degrade faster than some other areas of the blade 40. The repair foil 30 is prepared in advance and is cut to an appropriate size to cover the area of degraded thermal barrier coating that was removed from the leading edge 42. The repair foil 30 is wrapped around the leading edge 42 and may be tacked in place prior to the braze joining process. Alternatively, for airfoils having cooling holes 43 in the area to be repaired, plugs 45 may be inserted through the foil 30 and into the underlying cooling holes to secure the foil 30 to the underlying prepared substrate material 44 prior to brazing. In one embodiment, the plugs 45 may be formed of a ceramic material which prevents the braze material from entering the holes 43 during the brazing process and is subsequently removed by any known chemical or mechanical process. In another embodiment, the plugs 45 may be formed of nickel or other metal or alloy that is beneficial or at least not harmful to the superalloy substrate material 44. Such metal or alloy plugs 45 may melt during the brazing process and would then be removed by re-drilling the cooling holes 43 as necessary.

Because the foil 30 has a limited thickness, it can be brazed 18 to the substrate material 44 and then coated with the new thermal barrier coating 46 essentially as thick as the original coating material without causing any unevenness in the finished surface at the edges 48 of the underlying foil 30, thereby maintaining the aerodynamic performance of the repaired component as originally designed. As a result of the improved mechanical adhesion between the textured surface 36 and the overlying new thermal barrier coating 46, the refurbished leading edge region 42 may provide improved service performance when compared to the original blade 40 not having such a feature.

The braze material 34 may be selected to be boron and silicon free and to have a melting temperature and range below a solution heat treatment temperature used to restore the material properties of the component substrate material. When using a braze material incorporating a melting point depressant such as titanium, hafnium or zirconium or other material included in the composition of the underlying superalloy substrate material, the solution heat treatment is effective to homogenize the braze such that no discontinuity exists between the superalloy material 32 of the repair foil 30 and that of the underlying substrate 44.

A ternary alloy for such applications may have compositions within the following ranges (all compositions disclosed herein are in units of wt. %):

Cr 15-25%;
Ti 15-25%;
balance Ni.

Particular braze alloys within this group may have the following compositions: Cr 16.3%, Ti 21.2%, balance Ni; or Cr 17.2%, Ti 20.9%, balance Ni. These particular braze alloy compositions exhibit a solidus temperature of about 1,205° C. and a liquidus temperature of about 1,215° C., and thus a melting temperature range of only 10° C. As such, they may be particularly useful when brazing to Alloy 247 or Rene 80. Another braze alloy within this group has the following composition: Cr 20%, Ti 20%, Ni 60%.

Other braze alloys may have compositions within the following ranges:

Cr 12-16%;
Ti 13-16%;
Al 0-2.5%;
Co 2-4%;
W 3-5%;
Mo 0-2%;
Ta 0-2%;
balance Ni.

A particular braze alloy within this group may have the following composition: Cr 14.1%, Ti 14%, Al 2.1%, Co 3.1%, W 4.1%, Mo 1%, Ta 1%, balance Ni. This particular braze alloy composition may be particularly useful when brazing to Alloy 247.

Other braze alloys may have compositions within the following ranges:

Cr 15-18%;
Ti 10-15%;
Al 0-2.5%;
Co 2-4%;
W 3-5%;
Mo 0-2%;
Ta 0-2%;
balance Ni.

A particular braze alloy within this group may have the following composition: Cr 17.57%, Ti 13.54%, Al 2.39%, Co 3.24%, W 3.47%, Mo 1.15%, Ta 0.83%, balance Ni. This particular braze alloy composition exhibits a solidus temperature of about 1,205° C. and a liquidus temperature of about 1,220° C., and thus a melting temperature range of only 15° C. As such, it may be particularly useful when brazing to Alloy 247 or Rene 80.

Other braze alloys may have compositions within the following ranges:

Cr 15-19%;
Ti 8-10%;
Al 0-2.5%;
Co 14-18%;
Mo 12-16%;
balance Ni.

A particular braze alloy within this group may have the following composition: Cr 15.12%, Ti 10%, Al 2.12%, Co 15.8%, Mo 12.97%, balance Ni. This particular braze alloy composition exhibits a solidus temperature of about 1,205° C. and a liquidus temperature of about 1,223° C., and thus a melting temperature range of only 18° C. As such, it may be particularly useful when brazing to Alloy 247 or IN 939.

A typical solution heat treatment effective to homogenize a braze joint of such alloys may be:
  heat the assembly to 1,472° F. at 15-30° F. per minute;
  hold at 1,472° F. for 20 minutes;
  heat to 2,125° F. at 15-30° F. per minute;
  hold at 2,125° F. for 20 minutes;
  heat to 2,192-2,282° F. at 1-30° F. per minute;
  hold at 2,192-2,282° F. for 2-12 hours;
  furnace cool to 2,120-2,192° F.;
  hold at 2,120-2,192° F. up to 20 minutes;
  argon cool to room temperature.

Figure 4:
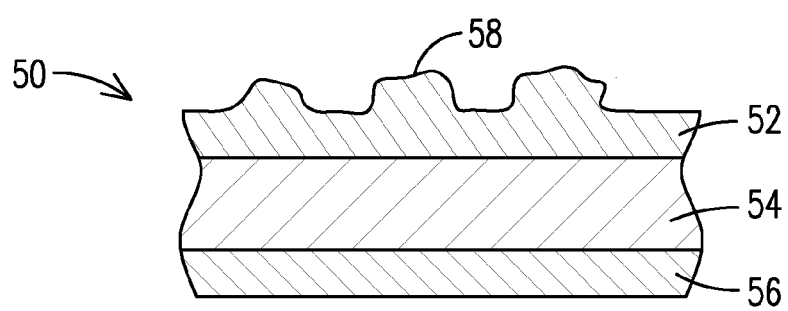
FIG. 4 is a partial cross-sectional view of a repair foil including a bond coat material layer.

FIG. 4 illustrates another embodiment of a repair foil 50 having a layer of bond coat material 52 such as an MCrAlY material disposed over the superalloy material 54 and braze material 56. In this embodiment the textured surface 58 is formed on the top surface of the bond coat material 52, thereby providing a good basis for mechanical attachment to a later-applied ceramic insulating layer. In various embodiments the braze material 34, 56 may be no more than 200 μm thick, the superalloy material 32, 54 may be 200-300 μm thick, and the bond coat material 52 may be 125-300 μm thick.

While various embodiments of the present invention have been shown and described herein, it will be obvious that such embodiments are provided by way of example only. Numerous variations, changes and substitutions may be made without departing from the invention herein.

The invention claimed is:

1. A method comprising:
  removing a degraded portion of a thermal barrier coating from a repair area of a component to reveal an underlying superalloy substrate material;
  applying a foil to the repair area, the foil comprising a layer of alloy material and a layer of braze material, the braze material being placed in contact with the underlying superalloy substrate material;
  wherein the layer of alloy material comprises a layer of superalloy material adjacent the braze material and a layer of bond coat material on the layer of superalloy material; and
  attaching the foil to the component with a braze heat treatment; and
  applying a new thermal barrier coating onto the bond coat material.

2. A method comprising:
  removing a degraded portion of a thermal barrier coating from a repair area of a component to reveal an underlying superalloy substrate material;
  applying a foil to the repair area, the foil comprising a layer of alloy material and a layer of braze material on a side of the alloy material, the braze material being placed in contact with the underlying superalloy substrate material;
  attaching the foil to the component with a braze heat treatment; and
  applying a new thermal barrier coating onto the alloy material;
  wherein the braze material comprises a ternary alloy comprising a composition in wt. % of: Cr 15-25%; Ti 15-25%; balance Ni.

3. A method comprising:
  removing a degraded portion of a thermal barrier coating from a repair area of a component to reveal an underlying superalloy substrate material;
  applying a foil to the repair area, the foil comprising a layer of alloy material and a layer of braze material on a side of the alloy material, the braze material being placed in contact with the underlying superalloy substrate material;
  attaching the foil to the component with a braze heat treatment; and
  applying a new thermal barrier coating onto the alloy material;
  wherein the braze material comprises a composition in wt. % within the following ranges:
  Cr 12-16%;
  Ti 13-16%;
  Al 0-2.5%;
  Co 2-4%;
  W 3-5%;
  Mo 0-2%;
  Ta 0-2%;
  balance Ni.

4. A method comprising:
  removing a degraded portion of a thermal barrier coating from a repair area of a component to reveal an underlying superalloy substrate material;
  applying a foil to the repair area, the foil comprising a layer of alloy material and a layer of braze material on a side of the alloy material, the braze material being placed in contact with the underlying superalloy substrate material;
  attaching the foil to the component with a braze heat treatment; and
  applying a new thermal barrier coating onto the alloy material;
  wherein the braze material comprises a composition in wt. % within the following ranges:
  Cr 15-18%;
  Ti 10-15%;
  Al 0-2.5%;
  Co 2-4%;
  W 3-5%;
  Mo 0-2%;
  Ta 0-2%;
  balance Ni.

5. A method comprising:
  removing a degraded portion of a thermal barrier coating from a repair area of a component to reveal an underlying superalloy substrate material;
  applying a foil to the repair area, the foil comprising a layer of alloy material and a layer of braze material on a side of the alloy material, the braze material being placed in contact with the underlying superalloy substrate material;
  attaching the foil to the component with a braze heat treatment; and
  applying a new thermal barrier coating onto the alloy material;
  wherein the braze material comprises a composition in wt. % within the following ranges:
  Cr 15-19%;
  Ti 8-10%;
  Al 0-2.5%;
  Co 14-18%;
  Mo 12-16%;
  balance Ni.

6. A method comprising:

preparing a foil comprising a layer of alloy material and a layer of braze material;

creating irregularities on a surface of the alloy material opposed the layer of braze material by one of an etching process, a casting process, or a spark plasma sintering process;

removing a degraded portion of a thermal barrier coating from a repair area of a component to reveal an underlying superalloy substrate material;

applying the foil to the repair area, the braze material being placed in contact with the underlying superalloy substrate material;

attaching the foil to the component with a braze heat treatment; and applying a new thermal barrier coating onto the surface of the alloy material over the irregularities.

\* \* \* \* \*